United States Patent
Medico et al.

(10) Patent No.: US 10,144,594 B2
(45) Date of Patent: Dec. 4, 2018

(54) METHOD FOR ORIENTING TUBE COMPONENTS

(71) Applicant: Aisapack Holding S.A., Vouvry (CH)

(72) Inventors: Léonard Medico, Vouvry (CH); Alexandre Gallet, Fully (CH); Florent Monay, Monthey (CH); Salim Kayal, Vouvry (CH); François Fleuret, Vouvry (CH)

(73) Assignee: Aisapack Holding S.A., Vouvry (CH)

( * ) Notice: Subject to any disclaimer, the term of this patent is extended or adjusted under 35 U.S.C. 154(b) by 0 days.

(21) Appl. No.: 15/515,656

(22) PCT Filed: Oct. 5, 2015

(86) PCT No.: PCT/IB2015/057612
§ 371 (c)(1),
(2) Date: Mar. 30, 2017

(87) PCT Pub. No.: WO2016/055924
PCT Pub. Date: Apr. 14, 2016

(65) Prior Publication Data
US 2017/0305685 A1    Oct. 26, 2017

(30) Foreign Application Priority Data
Oct. 7, 2014   (EP) .................................. 14187985

(51) Int. Cl.
*B65G 47/248*   (2006.01)
*B67B 3/26*     (2006.01)
(Continued)

(52) U.S. Cl.
CPC .......... *B65G 47/248* (2013.01); *B67B 1/00* (2013.01); *B67B 3/262* (2013.01); *G01B 11/27* (2013.01)

(58) Field of Classification Search
CPC .............................. B65G 47/248; G01B 11/27
(Continued)

(56) References Cited

U.S. PATENT DOCUMENTS

| 2004/0107063 A1* | 6/2004 | Weilenmann ...... G01D 5/24452 |
|---|---|---|
| | | 702/85 |
| 2015/0211958 A1* | 7/2015 | Bruecklmeier ........ G01B 11/26 |
| | | 356/138 |

(Continued)

FOREIGN PATENT DOCUMENTS

WO   WO 2011116902 A1   9/2011

OTHER PUBLICATIONS

European Opinion of EP14187985.8 dated Mar. 30, 2015.
(Continued)

*Primary Examiner* — Hina F Ayub
(74) *Attorney, Agent, or Firm* — Andre Roland S.A.; Nikolaus Schibli

(57) ABSTRACT

Method for orienting tube components (2), such as heads or stoppers, comprising a step of measuring the angular position (6) of a component followed by a step of orienting said component, in which step the angular correction of the component is determined especially while taking into account the measured signal (8); method characterized in that said angular correction is also determined while taking into account a modelled parasitic signal (15). The invention also comprises a device using said method.

20 Claims, 7 Drawing Sheets

(51) Int. Cl.
*B67B 1/00* (2006.01)
*G01B 11/27* (2006.01)

(58) Field of Classification Search
USPC .......................................................... 356/138
See application file for complete search history.

(56) References Cited

U.S. PATENT DOCUMENTS

2015/0323316 A1* 11/2015 Shchegrov ......... G01N 21/9501
    702/150
2016/0298604 A1* 10/2016 Guern ..................... F03D 15/00

OTHER PUBLICATIONS

European Search Report of EP14187985.8 dated Mar. 30, 2015.
International Search Report of PCT/IB2015/057612 dated Feb. 23, 2016.
Written Opinion of the International Search Authority dated Feb. 23, 2016.

* cited by examiner

Figure 1A
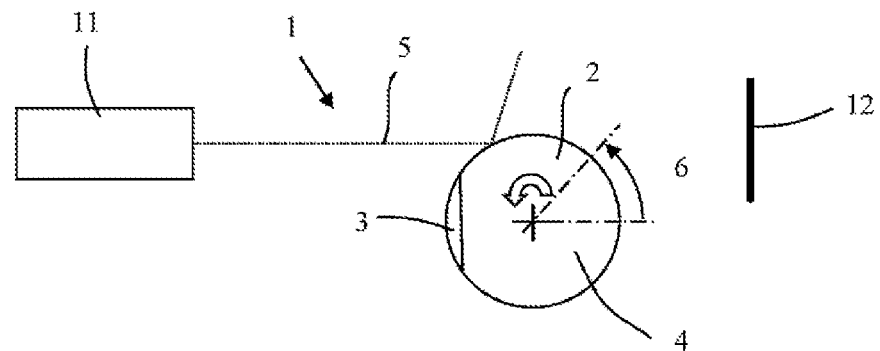
Figure 1B
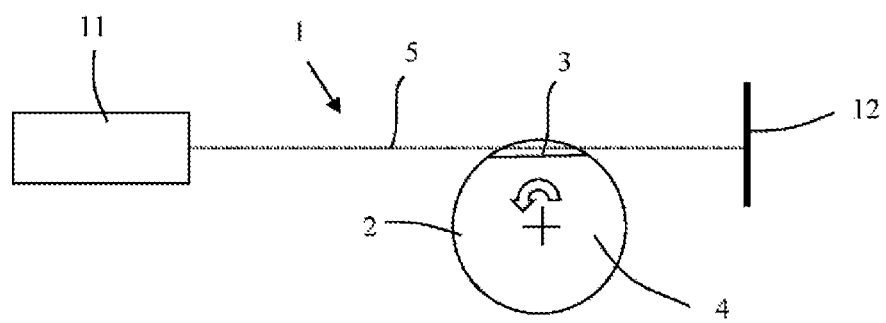
Figure 1C
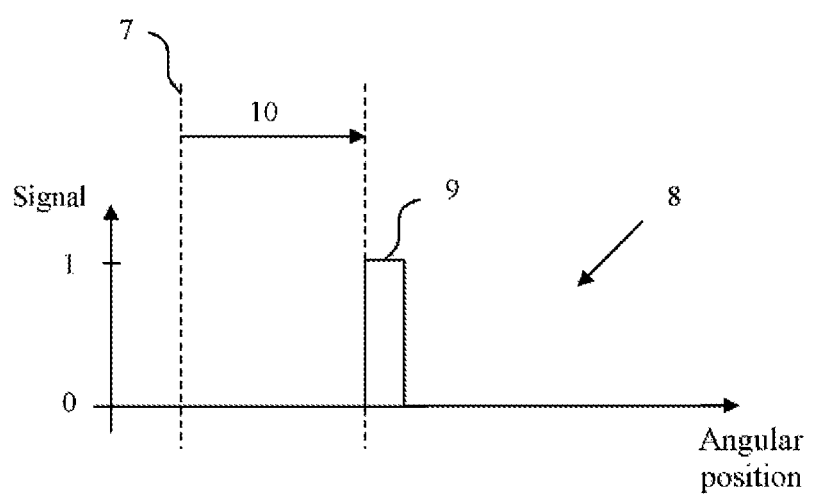
Fig. 1(prior art)

Figure 2A
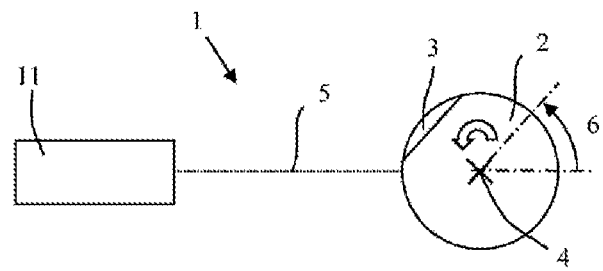
Figure 2B
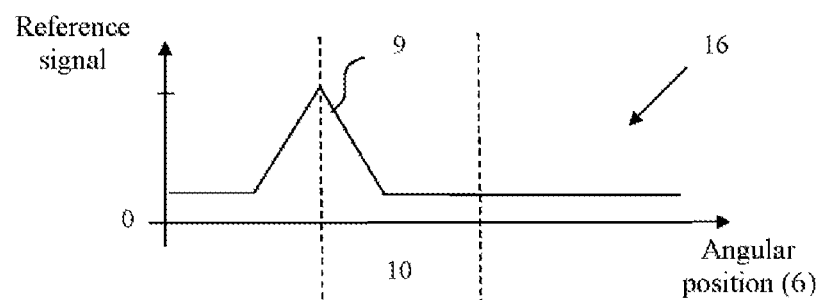
Figure 2C
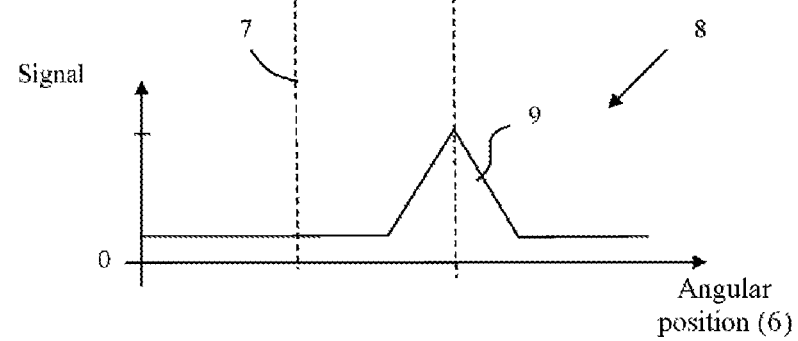
Fig. 2 (prior art)

Figure 3A
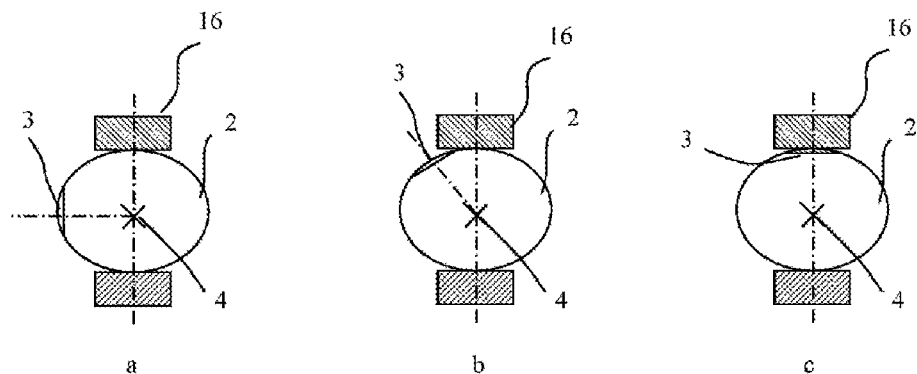
Figure 3B
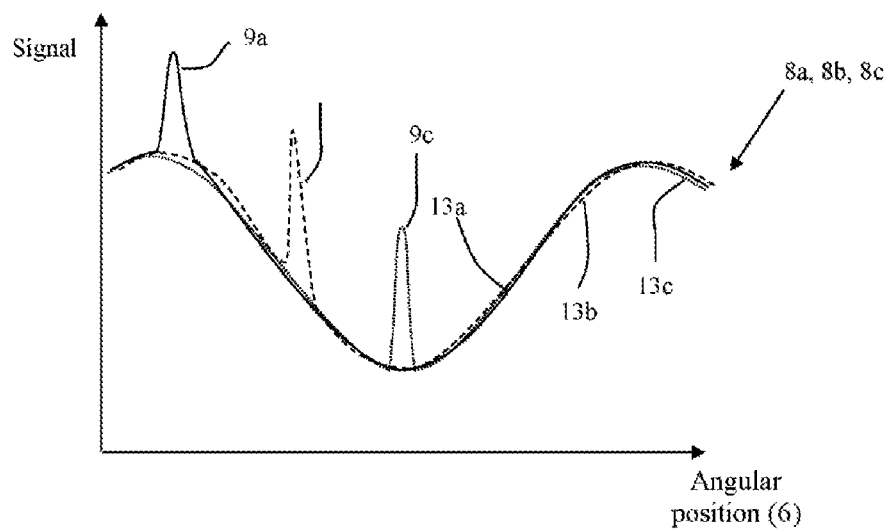
Figure 3 (prior art)

METHOD FOR ORIENTING TUBE COMPONENTS

CROSS REFERENCE TO RELATED APPLICATIONS

The present application is a U.S. national stage application of PCT/IB2015/057612 filed on Oct. 5, 2015 designating the United States, and claims foreign priority to European application no. EP14187985.8 filed on Oct. 7, 2014, the content of both documents being incorporated for reference in its entirety in the present application.

CORRESPONDING APPLICATIONS

The present application claims priority over the prior European application no. EP14187985.8 filed on 7 Oct. 2014 in the name of Aisapack Holding SA, the content of this prior application being incorporated for reference in its entirety in the present application.

FIELD OF THE INVENTION

The invention applies to the field of flexible tubes, and more particularly the packaging tubes for liquid or viscous products in which the tube head or the stopper is oriented facing the tube body.

STATE OF THE ART

For tubes for cosmetic, food or oral care use, it is often necessary to orient a component of the tube head relative to the flexible part forming the body of the packaging. The term tube head denotes, for example, a snap-on stopper fixed by snap-fitting onto the neck of the shoulder. For these stoppers, it is often desirable for the opening thereof to be oriented relative to the printing of the tube body. Other snap-on stoppers are screwed onto the neck of the tube. In this case, the orientation of the shoulder relative to the tube body is necessary for the stopper to be ultimately located in the desired position. More generally, when the tube head does not exhibit rotation symmetry, an orientation operation is necessary to orient the tube head relative to the tube body.

The orienting of the tube heads relative to the tube body has been known for a long time by those skilled in the art and is performed automatically on the production machines. The principle currently used described in FIG. 1 consists in rotating a component 2 locally including a notch 3. The beam 5 emitted by the laser cell 11 is obstructed by the component 2 in rotation (FIG. 1A) except when the notch 3 passes in front of the beam (FIG. 1B). At the moment of this alignment, the laser beam 5 emitted by the cell 11 is reflected by the mirror 12 and detected in return by the cell 11 (FIG. 1B). The signal emitted by this type of cell is illustrated (FIG. 1C). The obtained signal 8 is plotted as a function of the angular position 6 of the component 2. The signal takes the form of a pulse 9 corresponding to the alignment of the laser beam 5 and of the notch 3 during the rotation. The use of a servomotor to rotate the component 2, coupled with the device for detecting the notch 3 described previously makes it possible to then orient the component relative to a reference position 7.

Although very widely used, the system described previously comprises a number of drawbacks. A first drawback is linked to the geometry of the notch which is sometimes difficult to detect because of its form or its size. In some cases, the positioning of the cell 11 requires very precise settings, resulting in lengthy and costly setting times. Another drawback with this detection system is linked to the deformations of the components 2 by the clamps which hold the component 2 during the rotation. Finally, many components cannot be oriented by this device because their geometry is unsuitable (no notch 3) or because of their lack of opacity to the laser beam.

The patent application WO2011116902 proposes the orientation method illustrated in FIG. 2 in order to mitigate the abovementioned difficulties. In this application, it is proposed to arrange the cell 11 as illustrated in FIG. 2A and to analyze the return signal received by the cell during the rotation of the component 2. A reference signal 16 is defined for the position of the component 2 oriented in the reference angular position 7 (FIG. 2B). The orientation method proposed by Schulthess consists in acquiring the signal corresponding to the stopper to be oriented (FIG. 2C) and in comparing this signal 8 with the reference signal 16 in order to determine the phase difference 10. More specifically, Schulthess proposes computing the correlation between the signal 8 and the signal 16 as a function of the phase difference. The alignment is found for the phase difference 10 corresponding to the best correlation.

The orientation method proposed in the patent WO2011116902 makes it possible to solve a certain number of problems encountered subsequently. However, this method presents a number of drawbacks. The main drawback is illustrated in FIG. 3. FIG. 3A shows an example of deformation of the component 2 when it is held by the clamps 16 of the rotating tool. The views a, b and c of FIG. 3A represent the component 2 deformed by the clamps 16 for three angular positions of the component 2 relative to the clamps 16. FIG. 3B represents the signals 8a, 8b and 8c respectively in the views a, b, and c of FIG. 3A. The signals 8a, 8b and 8c are obtained during the rotation of the component 2 in front of the cell 11. In these signals, the characteristic peaks 9a, 9b and 9c correspond for example to the notch 3. FIG. 3B illustrates the best correlation obtained between two signals 8a, 8b and 8c according to the method proposed by Schulthess. It can be seen in FIG. 3B that the characteristic peaks 9a, 9b and 9c of the signals respectively denoted 8a, 8b and 8c are not superimposed. This result shows that, in this precise case, the method proposed in the patent WO2011116902 cannot be used. In this precise case, the alignment of the characteristic peaks 9a, 9b and 9c would not lead to a minimum or maximum correlation between the signals 8a, 8b and 8c. Generally, the method proposed by Schulthess cannot be applied when the characteristic signal of the component 9 is mixed with an interfering signal 13 with a phase that is totally independent. The method proposed by Schulthess does not in particular make it possible to orient the components deformed by the holding clamps during the rotation. Nor does this method apply when the tool generates a significant interfering signal, which is generally the case with industrial devices operating automatically. The interfering signal comprises parts linked to the rotating tool (functional plays, alignment defects, deformation of the component), others linked to positioning irregularities of the component in the rotating tool, and others linked to the environment (machine vibrations).

The method proposed in the invention described below makes it possible to mitigate the abovementioned drawbacks.

Definitions

In the present text, the term "component" corresponds to the number 2 in the figures and refers to the element of the tube head to be oriented relative to the tube body. The component is, for example, a stopper.

The term "notch" corresponds to the number 3 and is used to designate an element or several elements of the component making it possible to define an orientation by forming a detectable reference on the component 2.

These elements can be linked to the geometry of the component, to its surface condition, to its composition, to its color.

The term "cell" corresponding to the number 11 and generally designates a laser cell making it possible to emit and receive a signal. More generally, the term cell designates a device which emits a signal and receives at least a part of this signal having interacted with the component during its rotation.

The term "beam" corresponding to the number 5 refers to the signal emitted by the cell.

The term "interfering signal" corresponding to the number 13 designates the part of the signal received by the cell not comprising any information linked to the orientation of the component.

The term "model of the component signal" corresponding to the number 14 designates the part of the model comprising information specific to the component and useful for its orientation.

The term "model of the interfering signal" corresponding to the number 15 designates the part of the model comprising information of no use to the orientation of the component. The interfering model comprises, for example, the information linked to the deformation of the components in the rotating tool, to the positioning irregularities of the components in the rotating tool, to the functional plays of the tool, to the vibrations, etc.

SUMMARY OF THE INVENTION

The invention relates to a method for orienting components as defined in the claims and a device for implementing said method.

The invention proposes, in particular, an orientation method based on the rotating of the component to be oriented, the emission and the reception of a signal which interferes with the component. The information contained in the return signal, called "measured signal", is used to define the position of the component in the rotating tool. Then, the deduced angular correction is applied to orient the component in the desired position.

According to one embodiment, the invention comprises a first phase consisting in creating a model of the signal measured in a first phase called "modelling phase". Advantageously, the model of the measured signal is made up of the combination of a first signal representative of the component called "model of the component signal" and at least one second signal characteristic of the measurement apparatus and of its environment called "model of the interfering signal".

According to the invention, the combination of the model of the component signal and of the model of the interfering signal can for example be multiplicative or additive or of more complex form. A preferential embodiment of the invention consists of an additive combination.

According to the invention, the modelling phase is necessary for each new component and requires the acquisition of the measured signal for at least five components oriented randomly, and preferably at least ten components. The information contained in these measured signals is used to define the model of the signal.

On completion of the modelling phase, the measured signal is systematically replaced by the model of the signal and consequently broken down into a component signal model and a model of the interfering signal. The phase of the model of the component signal indicates the angular position of the component.

The method comprises a second phase called "calibration phase" consisting in defining the reference position of the component corresponding to the desired angular orientation. This phase requires the intervention of the operator who defines the phase difference required for a randomly oriented component. The phase difference is compared to the phase of the model of the component signal and the reference position is defined.

The method comprises a third so-called automatic orientation or production phase. During the production phase, the components are oriented automatically. The orientation method comprises a first step of replacement of the measured signal by the model of the signal. This operation consists at least in varying the phase of the model of the component signal and identifying the phase called "component phase" giving the best balance between the measured signal and the model of the signal. The best balance is obtained by minimizing the sum of the deviations squared between the measured signal and the model of the signal. The method then comprises a second step which consists in modifying the angular position of the component by the value of the phase difference between the component phase and the reference position defined previously.

According to the invention, the search for the component phase can be performed by jointly varying the phase of the component model and the phase of the interfering model and finding the best balance between the model of the signal and the measured signal. The preferred method consists in varying only the phase of the component model.

A first advantage of the invention is its robustness, which allows it to be used in industrial environments where the interfering noises have significant amplitudes. It notably allows the orientation of components even if the amplitude of the interfering signals is very much higher than the amplitude of the signal specific to the component.

A second advantage of the invention is the possibility of orienting components at a high production rate.

The invention for example makes it possible to orient components deformed by the rotating tool. The deformation of the component can be a function of its position in the rotating tool. The component deformation signal consequently cannot be used to orient the component and becomes an interfering signal. The invention makes it possible to separate the information linked to the orientation of the stopper and the interfering information linked to its deformation. The invention similarly makes it possible to separate the interfering information linked to the variations of positioning of the component in the rotating tool, or the interfering information linked to the defects of the rotating tool (out of round, vibrations, alignment defect).

This method makes it possible to define the angular position of the component even if the level of the interfering noise is inherent in the measurement system and its environment is of an amplitude higher than the signal characteristic of the component to be oriented.

The present invention is defined by the features contained in the independent claims, the dependent claims defining more particular embodiments thereof.

BRIEF DESCRIPTION OF THE FIGURES

FIG. 1 comprising FIGS. 1A, 1B and 1C represents the orientation device and method of the prior art and commonly used in the industry to orient components relative to tube bodies.

FIG. 1A illustrates a random position of the component in the orientation device.

FIG. 1B represents the detection of the notch 3 of the component during the orientation process.

FIG. 1C represents the signal resulting from the rotation of the component.

FIG. 2 comprising FIGS. 2A, 2B and 2C illustrates a second orientation method described in the patent application WO2011116902.

FIG. 2A represents the orientation device used.

FIG. 2B illustrates the reference signal corresponding to a known angular position of the component.

FIG. 2C represents a signal measured for a random position of the component.

FIG. 3 comprising FIGS. 3A and 3B illustrates a drawback of the method proposed in the patent application WO2011116902.

FIG. 3A shows the deformation of the component 2 in the clamps 16 of the rotating tool. The views a, b and c illustrate different angular positions of the component 2 in the clamps 16.

FIG. 3B illustrates the best correlation obtained between the signals 8a, 8b and 8c corresponding respectively to the views a, b and c of FIG. 3A. The best correlation between the two signals does not correspond to an identical orientation of the components.

FIGS. 5a, 5b and 5c illustrates the phase of creation of a signal model.

FIG. 5A illustrates the acquisition of the signals 8a, 8b, 8c, 8d, 8e and 8f corresponding to a random orientation of the components a, b, c, d, e and f during the modelling phase.

FIG. 5B illustrates the model of the component signal obtained from the modelling phase.

FIG. 5C illustrates the model of the interfering signal obtained from the modelling phase.

DETAILED DESCRIPTION OF THE INVENTION

Figure 4:
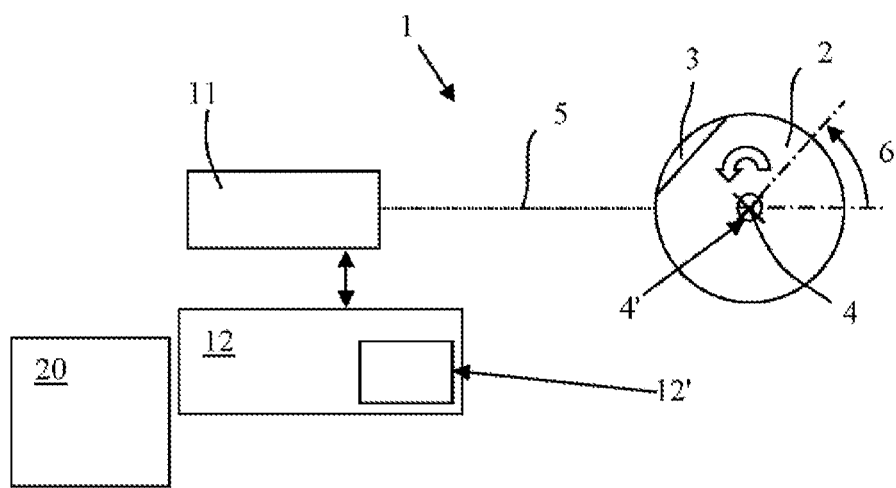
FIG. 4 illustrates the orientation device used in the invention.

The general principle of the invention illustrated in FIG. 4 is an orientation device and method based on the rotating of the component 2 to be oriented, the emission and the reception of a signal 5 which interferes with the component. The information contained in the return signal called "measured signal" is used to define the position of the component in the rotating tool. Then, the deduced angular correction is applied to orient the component in the desired position.

The orientation device illustrated in FIG. 4 comprises at least one cell 11 which emits and receives a signal 5 interfering with the component 2 in rotation about an axis 4, means for rotating the component 2, and means for processing the information from the cell 11. The cell 11 can be made up of two independent entities; a first for emitting the signal 5, a second for receiving the signal having interfered with the component.

More specifically, the device for orienting components according to the present invention comprises at least one cell 11 intended to emit and receive a signal 5 (preferably an optical signal) and information processing means 12, for example a system of computer type or other equivalent system.

According to a preferential embodiment of the invention, the cell 11 is an optical sensor of energy type which is linked to the information processing means 12. According to this preferential embodiment, said means 12 mainly comprise an independent processor 12'. This processor 12' notably performs the processing of the information sent by the cell 11 and by a coder 4' situated on the axis of the component rotating tool. Said coder 4' informs said processor 12 of the angular position of the rotating tool. When the phase difference of the component relative to the reference is computed, the processor 12' interacts with the control of the component rotating motor in order to orient said component in the correct position.

According to the preferential embodiment, the processor 12' is also linked to a display screen 20 which allows the operator to perform the initial settings and track the orientation of the components 2 during production.

The device described above is particularly advantageous because it makes it possible to orient components 2 at a high production rate. The use of an orientation processor 12' independent of the processor of the machine makes it possible to process the information relating to the orientation of the components 2 in parallel with the information linked to the driving of the machine and processed by the processor of the machine.

Another advantage of the proposed device is linked to its modularity. The device described in the present invention can be implemented with no great difficulty on machines that differ greatly in their operation or in their control mode. The device is also modular because it can be upgraded either at the information processing level or at the hardware level. This upgrading can be done independently of the rest of the machine.

Figure 7:
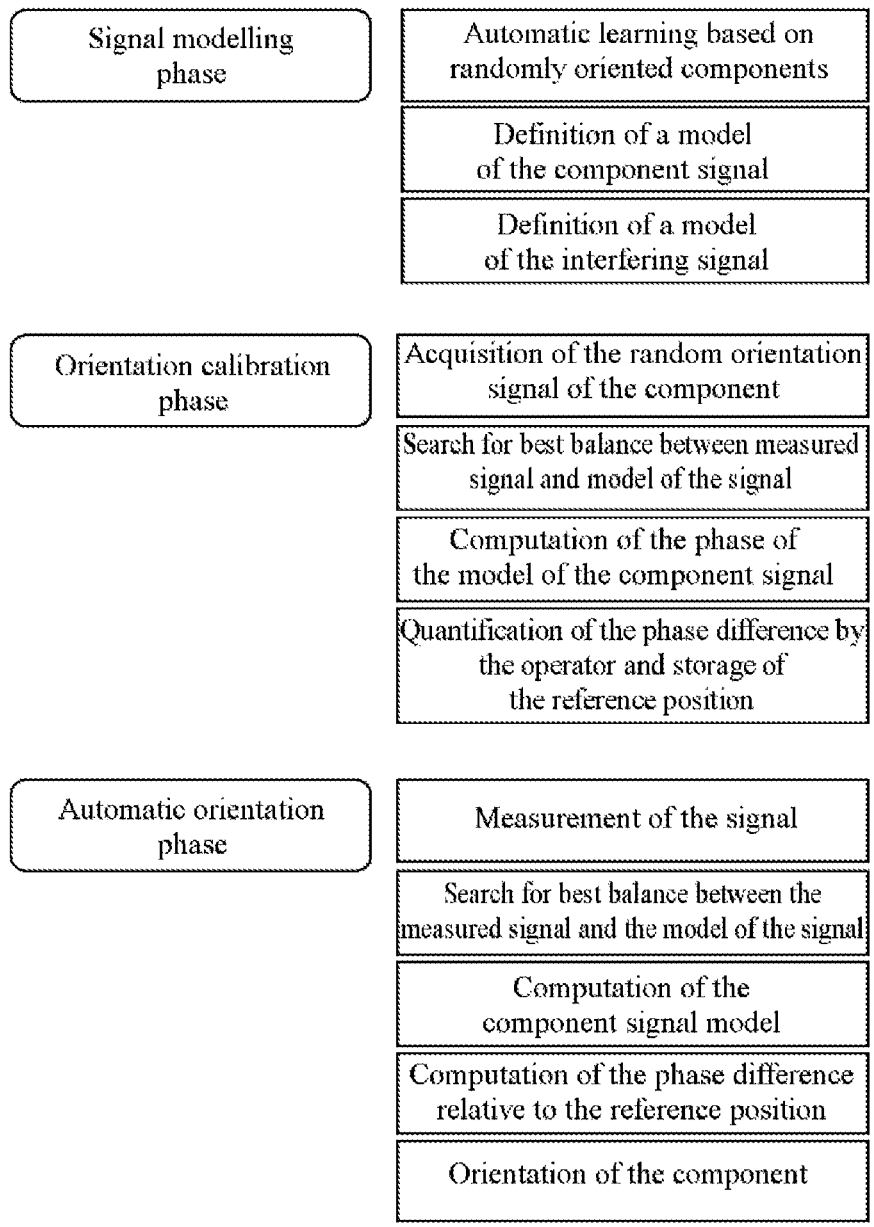
FIG. 7 shows the orientation method according to the invention.

The core of the invention lies notably in an orientation method whose main steps are described in FIG. 7. This method comprises at least three phases; a first so-called signal modelling phase, a second so-called calibration phase, a third so-called automatic orientation phase.

The modelling phase consists in acquiring a number of signals relating to components oriented randomly; then in executing an appropriate digital processing making it possible to define a model of the signal. The model of the signal according to the invention is made up of at least a model of the component signal and a model of the interfering signal. According to the invention, the model of the component signal comprises the information specific to the component and useful for defining its orientation whereas the model of the interfering signal comprises the information characteristic of the measurement apparatus and its environment and consequently of no use to the orientation of the component. In the model, the phase or the angular position of the model of the component signal is variable since it is precisely this angular position which has to be found in order to ultimately orient said component.

The modelling phase is done automatically by the machine, without intervention from the operator. For the defined model to be sufficiently robust, it is necessary for the model of the interfering signal to take account of the disturbances that can occur during production. For this reason, the acquisition of the signals for the modelling phase is performed in the production environment, that is to say with a machine setting identical to that used for the production. A minimum number of components must be used to give an account of all the disturbances that can occur during production and in order to obtain a distribution of the orientation of the components in the device that is sufficiently random. From experience, it has been found that the robustness of the model requires the successive acquisition of at least five signals corresponding to five components oriented randomly in the rotating device. Preferentially, at least ten signals are used to define the model. A greater number of signals may be necessary when the components are of poor quality and exhibit significant dimensional variations, or when the machine is worn or poorly adjusted. Generally, the packaging machines requiring this orientation operation operate at rates higher than 60 parts per minute and per station. The acquisition time for ten signals is therefore less than 6 seconds which indicates that a greater number of signals could be used without that having any significant impact on the machine setting time.

The modelling phase requires the search for the signal model from the signals acquired. An appropriate digital processing is performed on the basis of these data to define the model of the component signal and the model of the interfering signal. The model of the signal results from the combination of the model of the component signal and of the model of the interfering signal. Preferentially, the model of the signal results from an additive combination of the component signal and of the interfering signal. Multiplicative combinations or combinations of more complex form can also be envisaged. According to the invention, at least the phase of the component model is variable. The phase of the component signal model indicates the angular position of the component in the rotating tool. According to a preferential embodiment of the invention, the phase of the interfering signal model is constant, which indicates that the interferences are primarily linked to the tool rotating said component.

The component orientation method then comprises a calibration phase as indicated in FIG. 7. The aim of the calibration phase is to define the desired oriented position. This phase entails the intervention of the operator who indicates the value of the angular rotation to be applied (that is to say the value of the phase difference) to orient a component positioned randomly in the orientation device. The calibration phase comprises a number of steps. A first step consists in acquiring the signal for a stopper positioned randomly in the rotating tool. In a second step, the phase of the model of the component signal is then determined in order to minimize the deviation between the measured signal and the model of the signal. The phase of the component model that makes it possible to minimize the deviation defines the angular position of the component in the rotating tool. In the third step, the operator indicates the phase difference value to be applied to obtain the desired orientation. This last step makes it possible to define the reference angular position of the component signal model which corresponds to the oriented position of said component.

As indicated in FIG. 7, the third phase of the orientation method is the automatic orientation phase or production phase. During this phase the machine automatically orients the components at a high production rate. The automatic orientation phase comprises at least the succession of a step of acquisition of the signal, a step of searching for the phase of the component model, a step of computation of the phase difference to be applied relative to the reference position (oriented position), and, finally, a step of orientation of the component by applying the phase difference.

The automatic orientation phase must be performed within very short times given the rate of production. A major advantage of the invention is the possibility of achieving very high production rates. In the second step, the use of the model of the signal to define the phase of the signal allows for very short computation times. In this second step, there is a great benefit, by virtue of the model, in being able to replace the measured signal by a signal model resulting from the combination of a model of the component signal and a model of the interfering signal. This substitution is obtained by varying the phase of the model of the component signal and by comparing the model of the signal with the measured signal. The phase of the model of the component signal is determined when the deviation between the signal model and the measured signal is minimal. The method preferentially used to minimize the deviation between the signal model and the measured signal consists in minimizing the sum of the deviations squared between the two signals. The use of a model to perform these operations is a major benefit because the model of the signal can be broken down into a model of the component signal and a model of the interfering signal.

According to the invention, the orientation method also makes it possible to quantify the reliability of the orientation based on the analysis of the deviation between the model of the signal and the measured signal. The reliability value obtained can be used to eject the components whose orientation is deemed uncertain.

The method described in FIG. 7 offers great robustness because the interfering noises are subtracted. The advantage of the method lies in the use of a model for the interfering noises and a model characteristic of the component and of its orientation.

Figure 5:
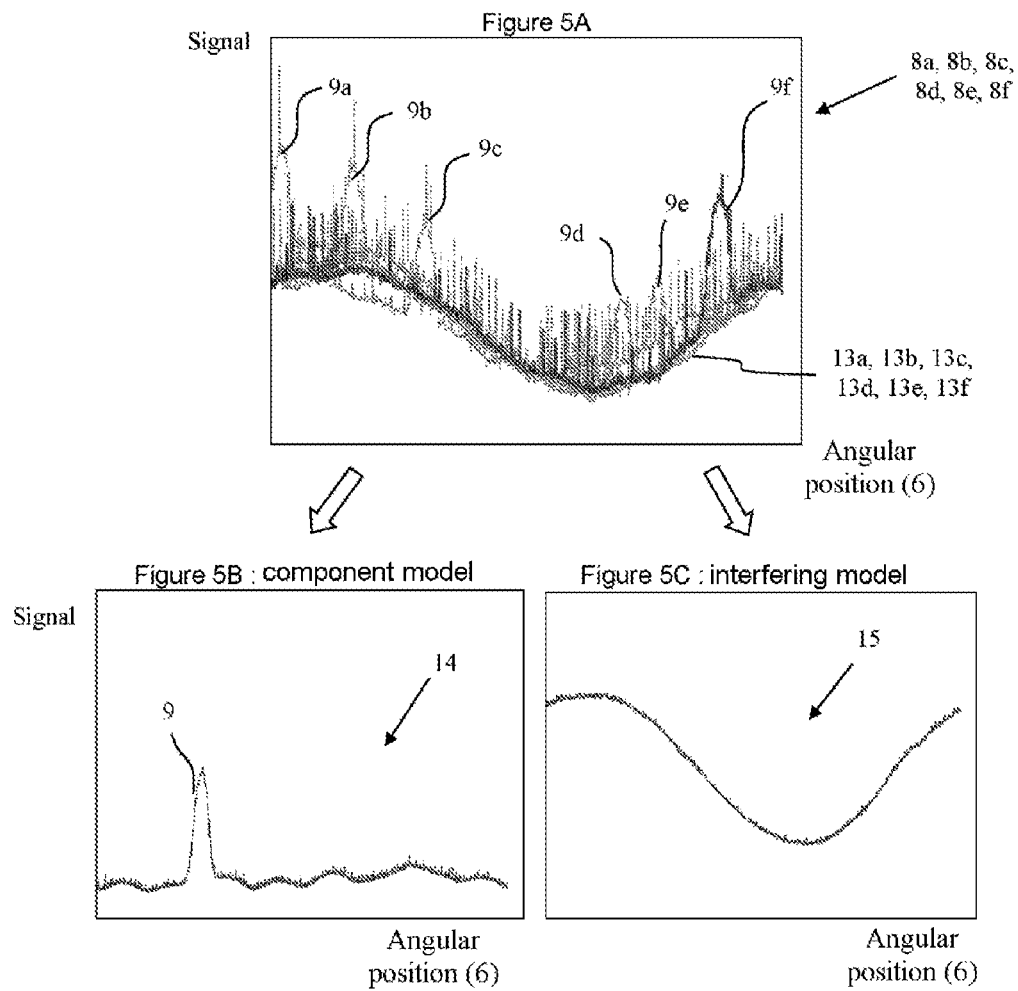
FIG. 5 comprising

FIG. 5 comprising FIGS. 5A, 5B and 5C illustrates the modelling phase. FIG. 5A shows an example of acquisition of measured signals 8a to 8f as a function of the angular position 6 of the rotating tool. As illustrated in FIG. 5A, it is possible to identify, in these signals, the peaks 9a to 9f whose phase varies and which are characteristic of the respective orientation of the components a to f in the rotating tool. It can also be seen that said measured signals 8a to 8f exhibit an interfering noise 13a to 13f in phase with the rotating tool. An appropriate processing of all the signals 8a to 8f makes it possible to obtain the model of the signal illustrated in FIGS. 5B and 5C. FIG. 5B represents the model of the component signal 14 whose phase is variable and which is representative only of the component and of its orientation. In this signal, the peak 9 which is the model of the peaks 9a to 9c of FIG. 5A is easily identifiable. FIG. 5B also shows a series of secondary peaks which can be used also for the orientation of the component but which are impossible to identify visually in the measured signals of FIG. 5A. This example shows that the method according to the invention makes it possible to identify characteristics of the component which are undetectable in the measured signal because of the interfering noises. FIG. 5C illustrates the model of the interfering signal 15 representative of the interfering noises 13a to 13f of FIG. 5A. In the model of the interfering signal illustrated in FIG. 5C, only the noises not randomly occurring are retained. In the example of FIG. 5, the model of the interfering signal 15 is in phase with the rotating tool. In the example of FIG. 5, the model of the signal corresponds to the sum of the model of the component signal illustrated in FIG. 5B and of the model of the interfering signal illustrated in FIG. 5C.

Figure 6:
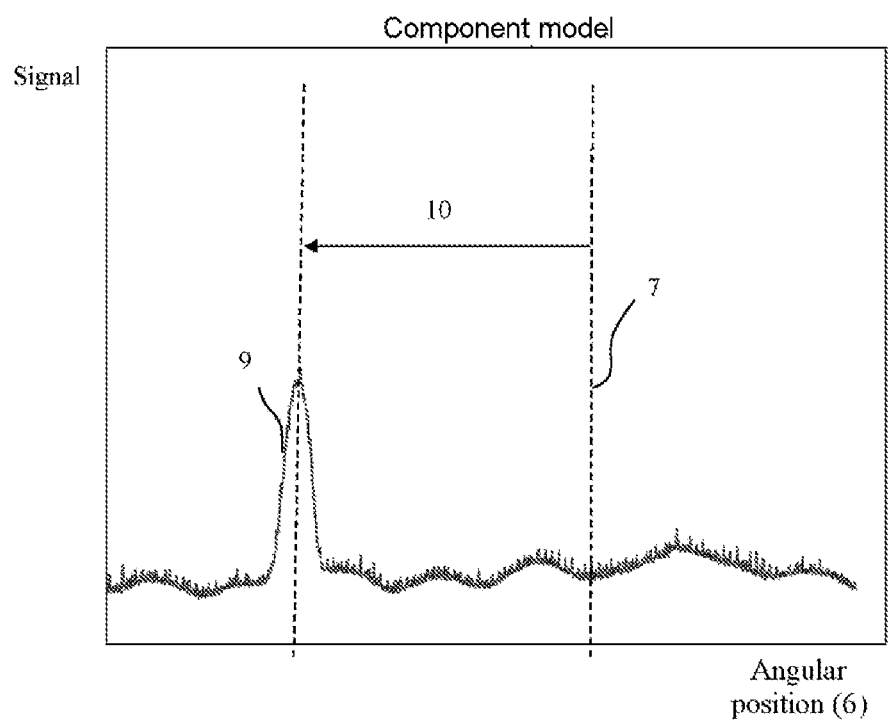
FIG. 6 illustrates the phase difference between the model of the component signal and the reference position.

FIG. 6 illustrates the operation performed during the calibration phase. This operation consists in determining the reference position 7 corresponding to the desired orientation of the component. During this calibration phase, the operator defines the angular rotation, that is to say the phase difference 10 to be applied to the component to obtain the desired orientation. As illustrated in FIG. 6, the phase difference is computed from the component model and not from the measured signal.

The orientation method described in the invention is particularly relevant for orienting stoppers relative to printed tube bodies. In particular, the invention makes it possible to orient clipped-on stoppers of "snap-on" type in order for the opening of the tube to be in accordance with the printing. The invention notably makes it possible to orient thin stoppers which are deformed in the clamps of the rotating tool.

The invention makes it possible to improve the accuracy of the orientation of the component because the phase difference 10 to be applied is defined with great accuracy.

The invention makes it possible to orient the components in a very short time, which makes it possible to achieve high production rates.

The invention makes it possible to reduce the rejects linked to dimensional variations of the components (deformations, removals) or color variations.

The invention makes it possible to considerably reduce the setting times upon a change of component (geometry, diameter, color).

The embodiments of the present invention are given as illustrative examples and should not be considered to be limiting. Variants are possible within the scope of the protection claimed, notably by using equivalent means.

For example, the signal emission and reception cell (11) could be in motion about the component which, for its part, would remain fixed.

Preferably, the cell is positioned on an axis at right angles to the axis of rotation of the object/component to be oriented. A position of the cell according to a plane parallel to the axis of orientation of the object can also be used if the information contained in the reading plane comprises information relating to the angular orientation of the component (for example the top surface of the object).

More generally, the positioning of the axis of the cell can be set according to different orientations relative to the orientation axis.

Any reference that can be detected on the component can be used in the context of the present invention to determine the position of said component and orient said component according to the principles of the present invention.

If the present description mentions an application for tube components, this is not limiting and other applications can be envisaged in which there is a desire to rapidly orient parts arranged randomly.

The signal used for the measurement and orientation can be an optical signal or other signal (electrical, magnetic, etc.) which is transformed if necessary for it to be processed according to the principles of the present invention.

The invention claimed is:

1. A method for orienting a tube component comprising the steps of:
measuring an angular signal representing an angular position of the tube component by determining a position of a reference of the tube component;
modelling the measured angular signal to replace the measured angular signal with a modelled angular signal taking into account a modelled interfering signal; and
orientating the tube component based on an angular correction of the tube component based on the modelled angular signal.

2. The method of claim 1, wherein the modelled angular signal includes the modelled interfering signal and a modelled component signal.

3. The method of claim 2, further comprising the steps of:
varying a phase of the modelled component signal and identifying a component phase to minimize a difference of the measured angular signal and the modelled angular signal; and
modifying the angular position of the tube component by a phase difference between the component phase and the position of the reference.

4. The method of claim 3, wherein in the step of varying, the component phase is searched by varying the phase of the modelled component signal and a phase of the interfering model to achieve a minimal difference between the modelled angular signal and the measured angular signal.

5. The method of claim 3, wherein in the step of varying, the component phase is searched by varying only the phase of the modelled component signal.

6. The method of claim 5, wherein the modelled interfering signal is determined based on a geometry of the tube component.

7. The method of claim 5, wherein the measuring performs an optical measurement.

8. The method of claim 1, wherein the modelled angular signal is determined by acquiring a series of measured angular signals in the step of measuring.

9. The method of claim 1, wherein the modelled angular signal is determined by acquiring signals measured on a plurality of tube components.

10. The method of claim 9, wherein the acquiring of the signals is performed on at least five tube components.

11. The method of claim 1, further comprising a step of:
calibrating the reference position of the tube component to correspond to a desired angular orientation of the tube component.

12. A device for orienting a tube component comprising:
a cell configured to emit and receive a signal; and
an information processing device including an orientation microprocessor,
wherein the cell and the information processing device are configured to,
measure an angular signal that represents an angular position of the tube component by determining a position of a reference of the tube component, and
orient the tube component based on an angular correction of the tube component based on the measured angular signal and a modelled interfering signal,
wherein the orientation microprocessor is configured to process information from the cell and from a coder located on an axis of a tool rotating the tube component indicating the angular signal.

13. The device of claim 12, further comprising:
a display screen.

14. The device of claim 12, further comprising:
a processing unit configured to produce the modelled interfering signal.

15. The device of claim 12, wherein the device is mounted to a production machine, and is independent of the production machine.

16. A machine for producing flexible tubes comprising a device for orienting a tube component according to claim 12.

17. A method for orienting a tube component comprising the steps of:

measuring an angular signal representing an angular position of the tube component by determining a position of a reference of the tube component;

modelling the measured angular signal to replace the measured angular signal with a modelled angular signal including a modelled interfering signal and a modelled component signal; and orientating the tube component based on an angular correction of the tube component that is based on the modelled angular signal.

18. The method of claim 17, further comprising the steps of:

varying a phase of the modelled component signal and identifying a component phase to minimize a difference of the measured angular signal and the modelled angular signal; and modifying the angular position of the tube component by a phase difference between the component phase and the position of the reference.

19. The method of claim 18, wherein in the step of varying, the component phase is searched by varying the phase of the modelled component signal and a phase of the interfering model to achieve a minimal difference between the modelled angular position and the measured angular position.

20. The method of claim 18, wherein in the step of varying, the component phase is searched by varying only the phase of the modelled component signal.

* * * * *